(12) United States Patent
Meriac et al.

(10) Patent No.: US 10,530,586 B2
(45) Date of Patent: Jan. 7, 2020

(54) METHOD, HARDWARE AND DIGITAL CERTIFICATE FOR AUTHENTICATION OF CONNECTED DEVICES

(71) Applicant: ARM IP Limited, Cambridge (GB)

(72) Inventors: Milosch Meriac, Cambridge (GB); Geraint Luff, Cambridge (GB)

(73) Assignee: ARM IP Limited, Cambridge (GB)

( * ) Notice: Subject to any disclaimer, the term of this patent is extended or adjusted under 35 U.S.C. 154(b) by 64 days.

(21) Appl. No.: 15/516,766

(22) PCT Filed: Sep. 22, 2015

(86) PCT No.: PCT/GB2015/052735
§ 371 (c)(1),
(2) Date: Apr. 4, 2017

(87) PCT Pub. No.: WO2016/055766
PCT Pub. Date: Apr. 14, 2016

(65) Prior Publication Data
US 2017/0295025 A1 Oct. 12, 2017

(30) Foreign Application Priority Data

Oct. 7, 2014 (GB) .................................. 1417746.3

(51) Int. Cl.
*H04L 29/00* (2006.01)
*H04L 9/32* (2006.01)
(Continued)

(52) U.S. Cl.
CPC .............. *H04L 9/3265* (2013.01); *H04L 9/14* (2013.01); *H04L 9/30* (2013.01); *H04L 9/3268* (2013.01);
(Continued)

(58) Field of Classification Search
CPC .............. H04L 63/0823; H04L 63/126; H04L 63/1416; H04L 9/3268; H04L 9/3265
See application file for complete search history.

(56) References Cited

U.S. PATENT DOCUMENTS 6,301,658 B1 * 10/2001 Koehler .................. G06F 21/33
380/255
7,366,892 B2 * 4/2008 Spaur ...................... B60R 25/04
713/151
(Continued)

FOREIGN PATENT DOCUMENTS

CA 2492986 C 3/2011
CN 1437375 A 8/2003
(Continued)

OTHER PUBLICATIONS

International Search Report and Written Opinion of the ISA for PCT/GB2015/052735, dated Nov. 23, 2015, 12 pages.
(Continued)

*Primary Examiner* — Ghazal B Shehni
(74) *Attorney, Agent, or Firm* — Nixon & Vanderhye P.C.

(57) ABSTRACT

A method of generating a shortcut certificate for authenticating a user digital certificate generated by an issuing certification authority; the method comprising: authenticating the digital certificate of the issuing certification authority; creating the shortcut certificate for the digital certificate of the issuing certification authority when the digital certificate of the issuing certification authority is authenticated; wherein the shortcut certificate comprises a signed entry of an authentication of the issuing certification authority.

21 Claims, 9 Drawing Sheets

(51) Int. Cl.
  *H04L 9/14* (2006.01)
  *H04L 9/30* (2006.01)
  *H04L 29/06* (2006.01)
  *H04W 12/04* (2009.01)
  *H04W 12/06* (2009.01)

(52) U.S. Cl.
  CPC ......... *H04L 63/0823* (2013.01); *H04W 12/04* (2013.01); *H04W 12/06* (2013.01); *H04L 2209/80* (2013.01)

(56) References Cited

U.S. PATENT DOCUMENTS

2002/0147905 A1* 10/2002 Perlman ................ H04L 9/3265 713/157
2004/0093493 A1* 5/2004 Bisbee ................... G06Q 20/00 713/156

FOREIGN PATENT DOCUMENTS

| CN | 102959590 A | 3/2013 |
| EP | 0 328 232 | 8/1989 |
| GB | 2 357 225 | 6/2001 |
| WO | WO 01/89133 | 11/2001 |

OTHER PUBLICATIONS

Search Report for GB 14 17746.3, dated Apr. 15, 2015, 3 pages.
R. Hummen et al., "Towards Viable Certificate-based Authentication for the Internet of Things", Hot Topics on Wireless Network Security and Privacy, Apr. 19, 2013, pp. 37-42.
International Preliminary Report on Patentability dated Apr. 20, 2017 in PCT/GB2015/052735, 8 pages.
First Office Action for CN Application No. 201580054503.X dated Aug. 2, 2019 and English translation, 26 pages.

* cited by examiner

METHOD, HARDWARE AND DIGITAL CERTIFICATE FOR AUTHENTICATION OF CONNECTED DEVICES

This application is the U.S. national phase of International Application No. PCT/GB2015/052735 filed 22 Sep. 2015, which designated the U.S. and claims priority to GB Patent Application No. 14 17746.3 filed 7 Oct. 2014, the entire contents of each of which are hereby incorporated by reference.

The present technique relates in general to improved methods of authenticating a user digital certificate generated by an issuing certification authority. In some embodiments the issuing certification authority belongs to a hierarchy of certification authorities.

There are ever increasing numbers of networked devices within the home, other buildings or the outdoor environment that have processing and communication capabilities which allow them to interact with other processing devices. Everyday objects and relatively small scale processing devices may be connected to each other and to central platforms as part of the "Internet of Things". For example, access to a front gate of a home may be controlled by a digital key (e.g. swipe card) rather than a physical key and the same digital key may be used to access the front door of the home and serve to grant permissions to the user to access various connected devices throughout the home environment such as heating and lighting controls. Such permissions are generally given on a basis of trust between devices and in order to establish trust between devices authentication protocols are used. Hence, in a variety of applications it can be important to provide authentication between devices of the network.

The present technique provides for improved authentication methods and an apparatus providing the same.

Features and advantages of the technique will be apparent from the following detailed description of illustrative embodiments which is to be read in connection with the accompanying drawings.

Figure 1:
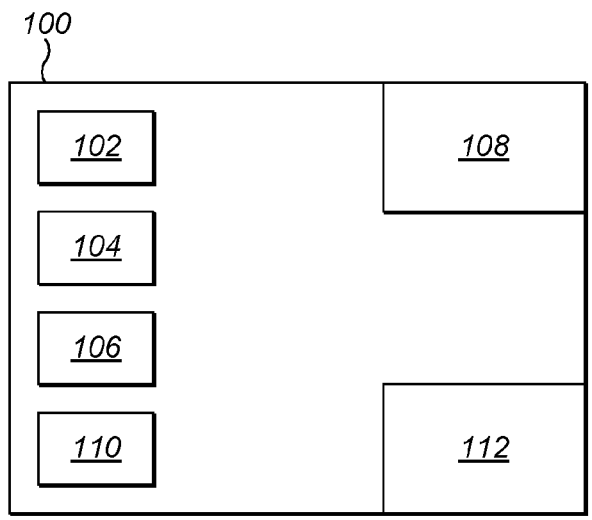
FIG. 1 illustrates schematically a digital certificate.

FIG. 1 illustrates an example of a digital certificate 100 which may comprise a serial number 102, information identifying the issuer of the certificate 104, information identifying the owner of the certificate 106, the owner's public key 108 and information about the validity period 110 of the digital certificate 100. The digital certificate 100 is digitally signed with the issuer's private key 112. Digital certificates 100 may also include extensions and extended properties that provide additional information about the certificate's subject such as the subject's email address and the activities that the certificate's subject can perform with privileges and permissions.

A trusted organization assigns the digital certificate 100 to an individual or an entity that associates a public key with the individual. The individual or entity to whom the certificate 100 is issued is called the subject of that digital certificate 100. The trusted organization that issues the digital certificate 100 is a certification authority and is known as the certificate's issuer. A trustworthy certification authority will only issue the digital certificate 100 after verifying the identity of the digital certificate's 100 subject. Digital certificate 100 structures can be in a standardised format such as that specified in the ITU X.509 standard, among others.

The certification authority also provides a place to notify users when the digital certificate becomes invalid and is revoked. Revocation may occur if the user has left the employment of a company or loses control of the corresponding private key because of theft or being compromised in some way. When a certification authority is informed that the certificate 100 is no longer trusted for some reason, the certification authority revokes the digital certificate 100 by placing it on a Certificate Revocation List, which can be in a standardised format such as that specified in the ITU X.509 standard, among others.

Figure 2:
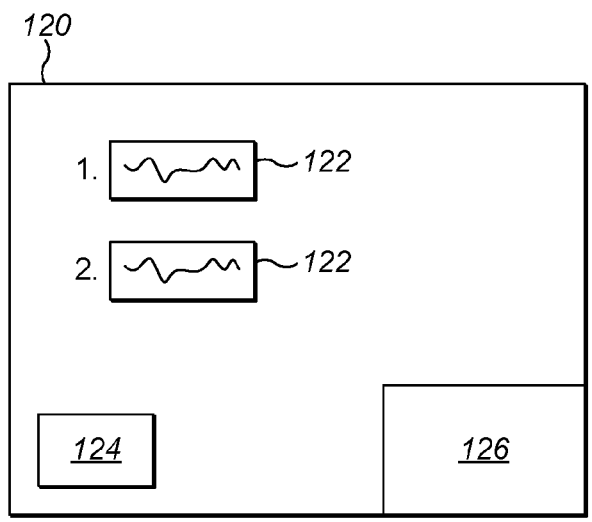
FIG. 2 illustrates schematically a certificate revocation list.

Referring to FIG. 2, a central revocation list 120 contains a serial number 122 of each revoked certificate and the date and time 124 at which the certificate revocation list 120 was issued. The central revocation list 120 is also signed by the issuing certification authority using the digital signature 126 of the issuing certification authority.

A certification authority can be a member of a hierarchy of trust of certification authorities. A hierarchy of trust begins with at least one certification authority that is trusted by all entities in the certificate chain. The trusted certification authority is named the root authority. The root authority then certifies other certification authorities, called level 1 certification authorities, who can issue certificates and also certify additional or level N, where N is 2 or more, certification authorities.

Figure 3:
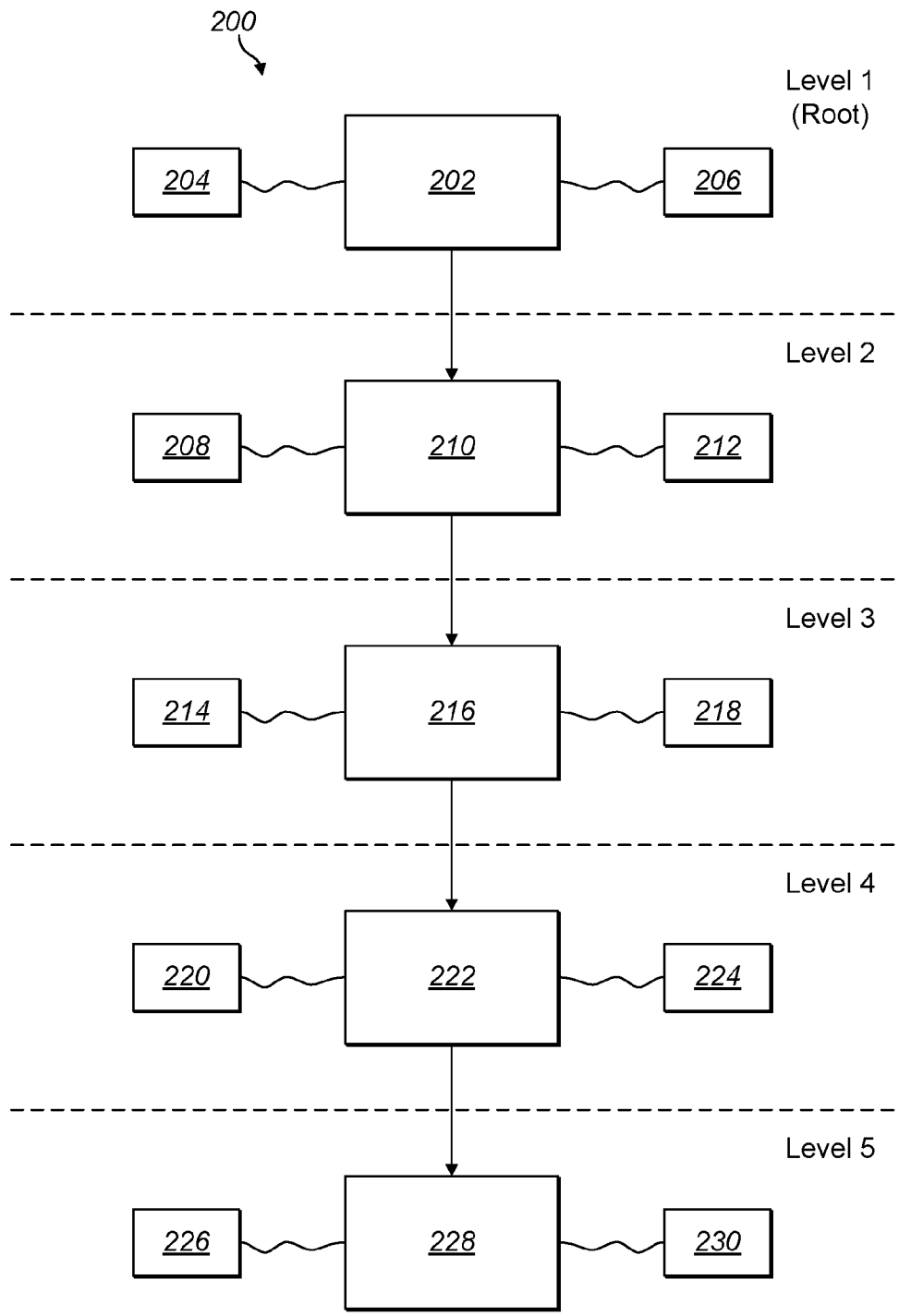
FIG. 3 illustrates schematically a hierarchy of certification authorities.

FIG. 3 illustrates schematically a hierarchy 200 of certification authorities having a total of 5 levels. The highest and first level certification authority is the Root 202. The Root 202 may sign its own root certificate 204 and puts out a root certificate revocation list 206 in accordance with its security policy and issues digital certificate 208 to a second level certification authority 210, which puts out its own certificate revocation list 212. The second level certification authority 210 issues digital certificate 214 to third level certification authority 216, which also maintains its own certificate revocation list 218 in accordance with its security policy. Further down the chain, a digital certificate 220 is issued to a fourth level certification authority 222 by third level certification authority 216 and digital certificate 226 is issued by the fifth level certification authority 222 by the fourth level certification authority 222. Both the fourth and fifth level certification authorities 222 and 228 respectively may maintain their own certificate revocation lists 224, 230 respectively. Although the above is described with respect to one certification authority issuing a digital certificate to one other certification authority in the chain, it is normal for one certification authority to issue digital certificates to multiple users and multiple certification authorities thereby creating a family tree pattern of hierarchy from the root 202.

Figure 4:
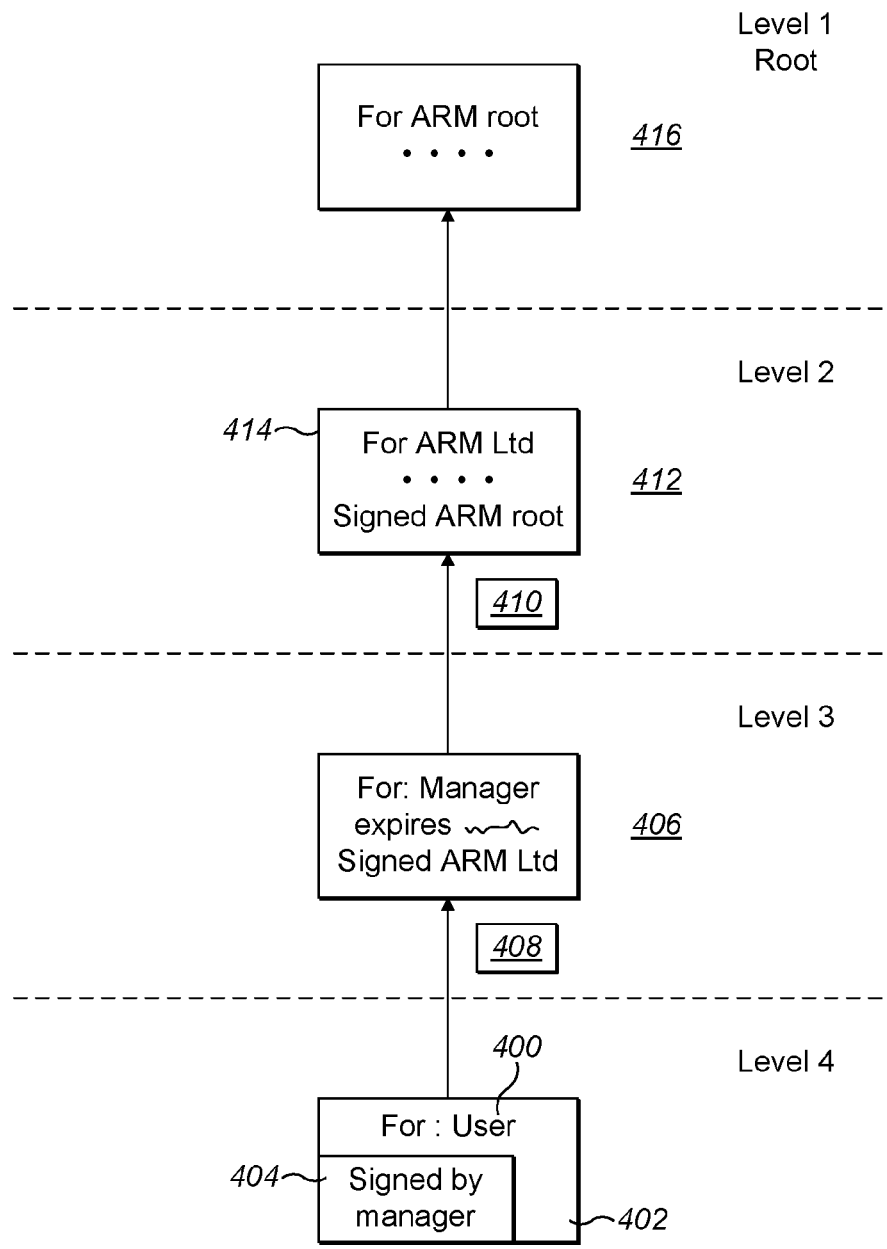
FIG. 4 illustrates schematically a certificate chain of certification authorities.

FIG. 4 illustrates schematically one example of a certificate chain of certification authorities in use.

As seen in FIG. 4, user 400 has a digital certificate 402 bearing a digital signature 404 of a level 3 certification authority 406. User 400 presents the digital certificate 402 for authentication to an agent device (not shown in FIG. 4) in order to access a resource which must validate the credentials to authenticate and trust the presented digital certificate 402 before allowing the user 400 to access the resource. Authenticating the digital certificate 402 can be a time consuming and computationally intensive process. In order for certification to be valid, several checks must be performed in respect of the digital certificate 402 including checking the validity period of the digital certificate 402; checking a central revocation list for serial number to ensure the digital certificate 402 has not been revoked; the issuing certification authority's digital signature 404 must be validated with the issuer's public key to ensure that the certification authority digital signature is authentic; and the permissions of the user in respect of that digital certificate 402 to access the requested resource must be checked.

Moreover, since the user 400 belongs to a large organisation having a hierarchy of digital certification authorities and the digital certificate 402 has been issued by the level 3 certification authority 406, its signing chain must be traced and verified up to a level of trust programmed to the agent device in line with its own security policy. Typically the validation is performed on a remote server networked with the agent device and the exchange of all information between remote server, agent device and user 400 must be made in a secure environment. As will be appreciated, such an authentication can become burdensome for large organisations. Should user 400 belong to a smaller organisation then normally the following steps of checking the validity period of the digital certificate 402 and checking a central revocation list for serial number to ensure the digital certificate 402 has not been revoked are performed. Also the issuing certification authority's digital signature 404 is validated with the issuer's public key to ensure that the certification authority digital signature is authentic; and the permissions of the user in respect of that digital certificate 402 to access the requested resource is checked. Even in the event of no certificate chain being present a certain amount of computing resource and time is spent whenever the credentials are checked. Both small and large organisations that use a centralised-verification-model rely on connectivity which can cause their access protocols to be fragile to an occurrence of outages.

In step 408, since the security policy of the agent device does not trust or recognise the authority of the level 3 certification authority, further information is required. In step 410, the validation is escalated to the level 2 certification authority which is a digital certificate 414 signed by the root 416. Accordingly, since the root 416 is trusted the hierarchal chain is verified and in the event that the permissions of the user 400 in respect of that digital certificate 402 to access the requested resource are sufficient then access to the resource of the agent device is allowed.

Figure 5:
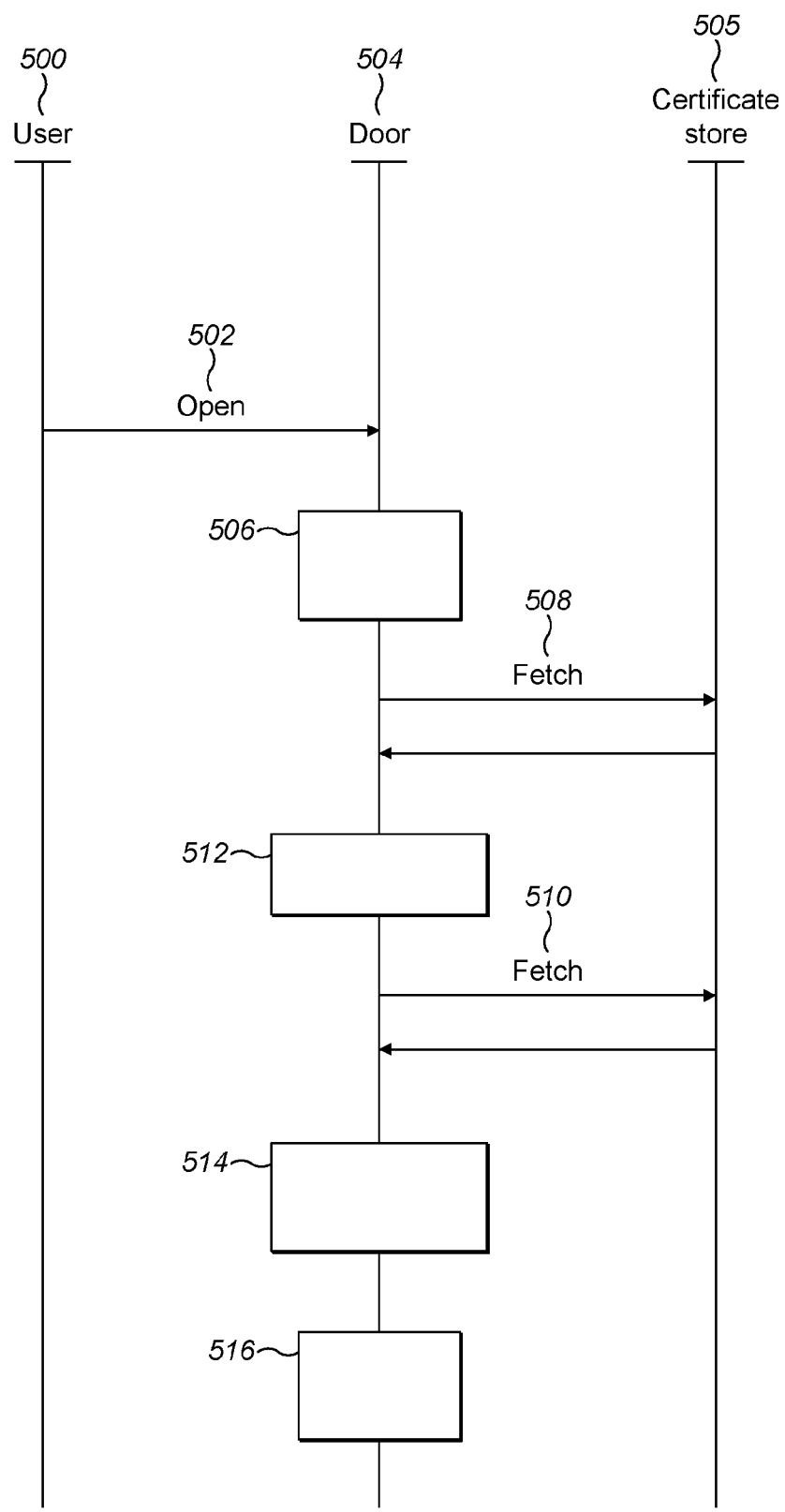
FIG. 5 illustrates schematically an example timeline showing progress of a certificate chain authentication process.

Referring to FIG. 5 an example timeline showing progress of a certificate chain authentication process comprises a user 500 seeking to open at step 502 a door 504. In line with previous terminology the door 504 is an agent device and the ability to open the door 504 is a resource provided by the door 504. In step 502, the user 500 cites their digital certificate to the door 504 in order to prove identity. Security credentials are checked and the hierarchy of certificate chains is followed in step 506 on the initiation of the door 504 in order to establish trust in the validity of the digital certificate. In step 508, the door 504 fetches certificates from a certificate store 505 and follows the hierarchical chain up until a trusted authority is reached which as shown in step 510 is a process that may comprise further escalations up the chain 512. Hierarchical certificates are verified at step 514 which when successful allow the user to open the door at step 516.

Figure 6:
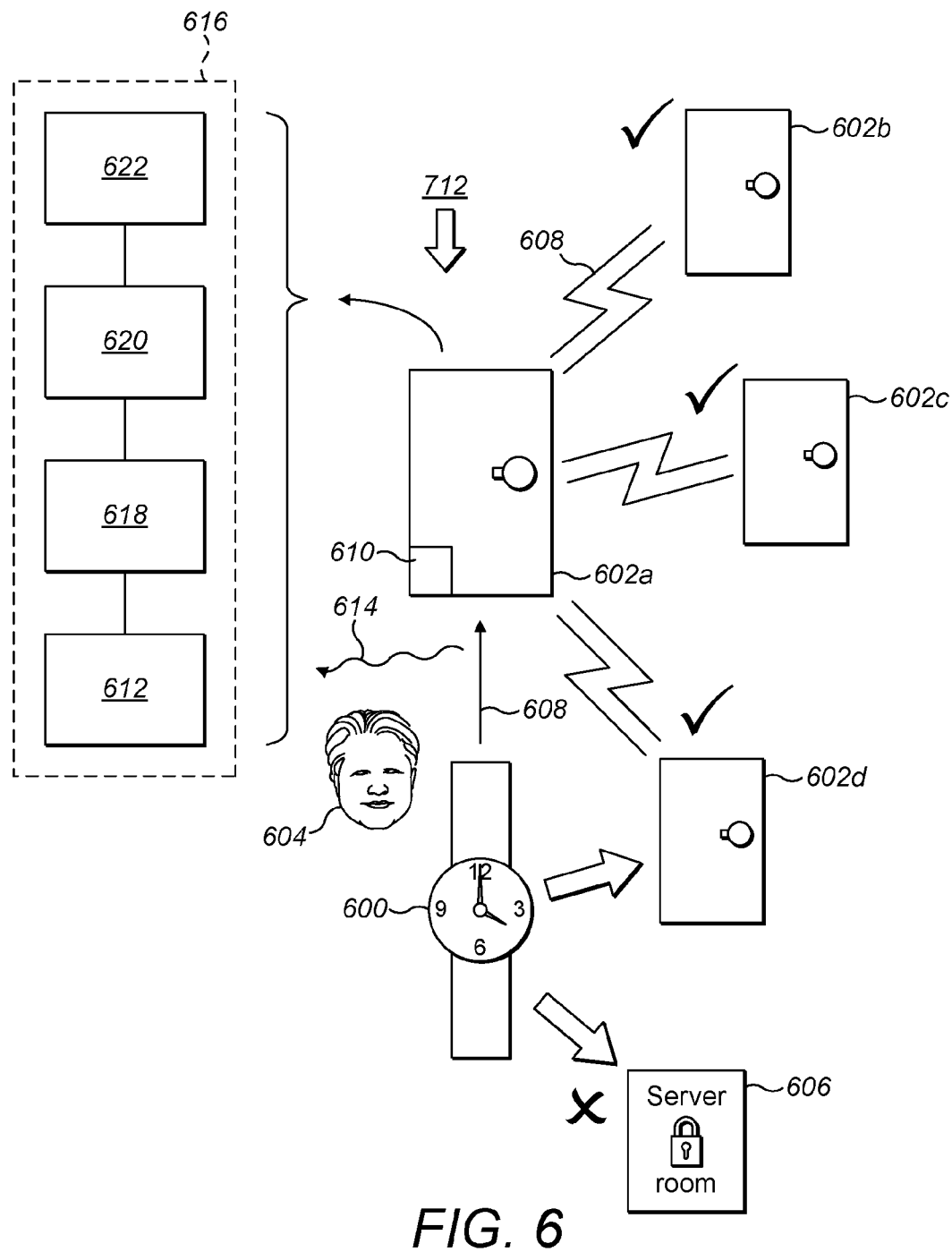
FIG. 6 illustrates schematically a network of nodes communicating a created shortcut certificate between each other.

FIG. 6 illustrates schematically a network of nodes communicating a created shortcut certificate between each other in the network. Referring to FIG. 6, an envoy device such as a smart watch 600 communicates with an agent device such as an entry door 602 for the purposes of a user 604 seeking entry through the entry door 602a into a secure building (not shown).

In general, entry may be facilitated by or governed by different nodes within the network. For example, the network may comprise nodes comprising of any one of a central application providing apparatus, a local server or a cloud server which interacts with one or more agent devices. An envoy device such as a wrist worn device (e.g. watch) or smart phone equipped with communication channels may be carried by the user and comprise in its local memory the digital certificate of the user for authentication with any of the nodes in the network in order to access any one of many resources provided by the nodes in the network. Such authentication could be between the envoy device of the user and an agent device such as a front door of a home in order to access a resource such as permission to open the front door. However, since many agent devices in the Internet of Things may have little processing capability, providing resources in the agent device for establishing authentication can be difficult and may significantly increase the cost of the agent device. The rapid and wide deployment of such agent devices means there is also a desire to make authentication as quick and efficient as possible across multiple agent devices. As can be seen with reference to FIG. 6 and the accompanying drawings, the use of a shortcut certificate makes authentication quick and efficient.

In FIG. 6, the building is a smart connected building meaning that throughout the building there may be many if not hundreds of connected devices. Illustrated in FIG. 6 are a plurality of connected agent devices being doors 602a, 602b, 602c, 603d and door 606. The doors 602a-d and door 606 are connected in the sense that they may form part of a peer-to-peer network within a connected class of agent devices. The class of agent devices in this case is doors, but could equally be light bulbs, switches, temperature monitoring devices or a combination of these. The entry door 602a comprises processing circuitry 610 for controlling various processing operations performed by the door 602a, such as mutual authentication, encryption of data sent to other nodes in the network and key generation for example. Other nodes on the network could include other doors of the same class of agent device, other classes of agent device (eg., light bulbs, switches and temperature monitoring devices or a combination of these). Connectivity between doors 602a-d and between watch 600 and door 602a-d may be provided using a wireless communication 608, such as using a wireless local area network (WiFi), short range communication (NFC), or communications used in wireless sensor networks such as Zigbee or Bluetooth or 6LoWPAN. Connectivity may also be provided by a wired communication such as using a fibre optic or metal cable (not shown). In the case of the envoy device this may require a removable media such as a USB stick and may provide enhanced security protection.

When the watch 600 is in close proximity to the door 602*a* the watch transmits in step 608 its digital certificate 612 for authentication to the door 602*a*. It will be appreciated that in order for the user 604 to pass through the entry door 602*a*, the entry door 602*a* must first validate the credentials to authenticate and trust the presented digital certificate 612 before allowing the user 604 to enter the building. Accordingly, the entry door 602*a* communicates in step 614 to a certificate store 616 to verify the hierarchical certificate chain of the digital certificate 612. The hierarchical certificate chain is followed 618, 620, and 622 until a trusted resource is reached in line with the security credentials of the building management provided to the entry door 602*a*. Upon verification of the chain, the verification is communicated to the entry door 602*a* and the user 604 is allowed to enter the building.

Subsequently, and once inside the building the user 604 approaches a second door 602*d*, which may be an internal partition door or conference room door. Since second door 602*d* is also security enabled it will be appreciated that in order for the user 604 to pass through the second door 602*d*, the second door 602*d* must also first validate the credentials to authenticate and trust the presented digital certificate 612 before allowing the user 604 to enter the room guarded by the second door 602*d*. Accordingly, the second door 602*d* may also communicate to the certificate store 616 to verify the hierarchical certificate chain of the digital certificate 612. The hierarchical certificate chain is followed 618, 620, and 622 until a trusted resource is reached in line with the security credentials of the building management provided to the second door 602*d*. Upon verification of the chain, the verification is communicated to the second door 602*d* and the user 604 is allowed to enter the room guarded by the second door 602*d*.

As will be appreciated by a person skilled in the art, in a connected secure environment where multiple agent devices are accessed by user in a large organisation using a hierarchical certificate chain system, the processing and time spent re-authenticating previously authenticated users for access to a similar class of agent devices is burdensome. Accordingly, in order to reduce the overhead of time and processing resource needed, upon receipt of validation of authentication of the user 604, the entry door 602*a* communicates a shortcut certificate to the other doors 602*b-d* that form part of its trusted peer-to-peer network so that each door in that network does not need to check the credentials of the user certificate 612 with a certificate store 616 perhaps located on a remote server.

Figure 7:
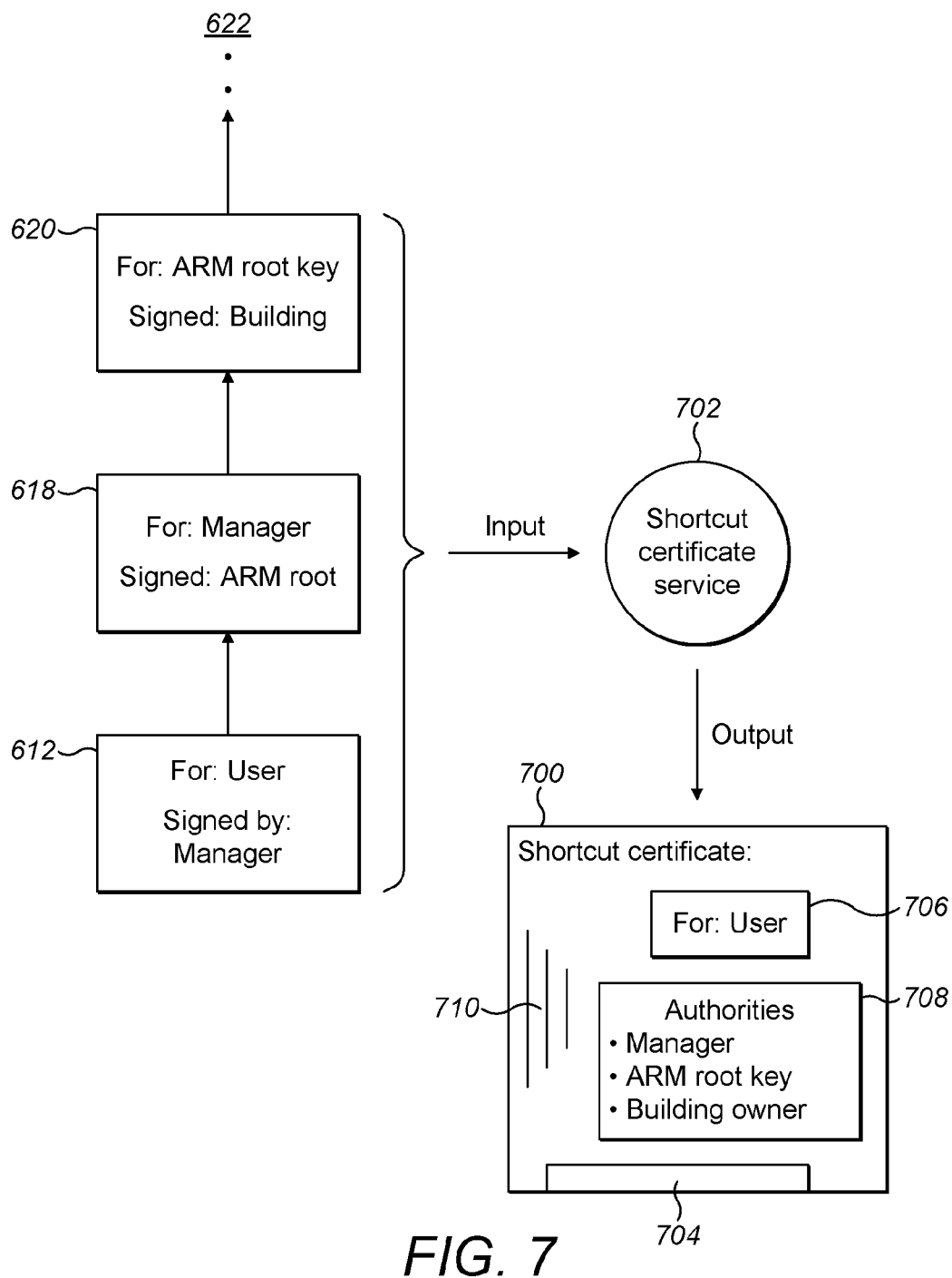
FIG. 7 illustrates schematically a shortcut certificate service provider as part of the network.
Figure 8:
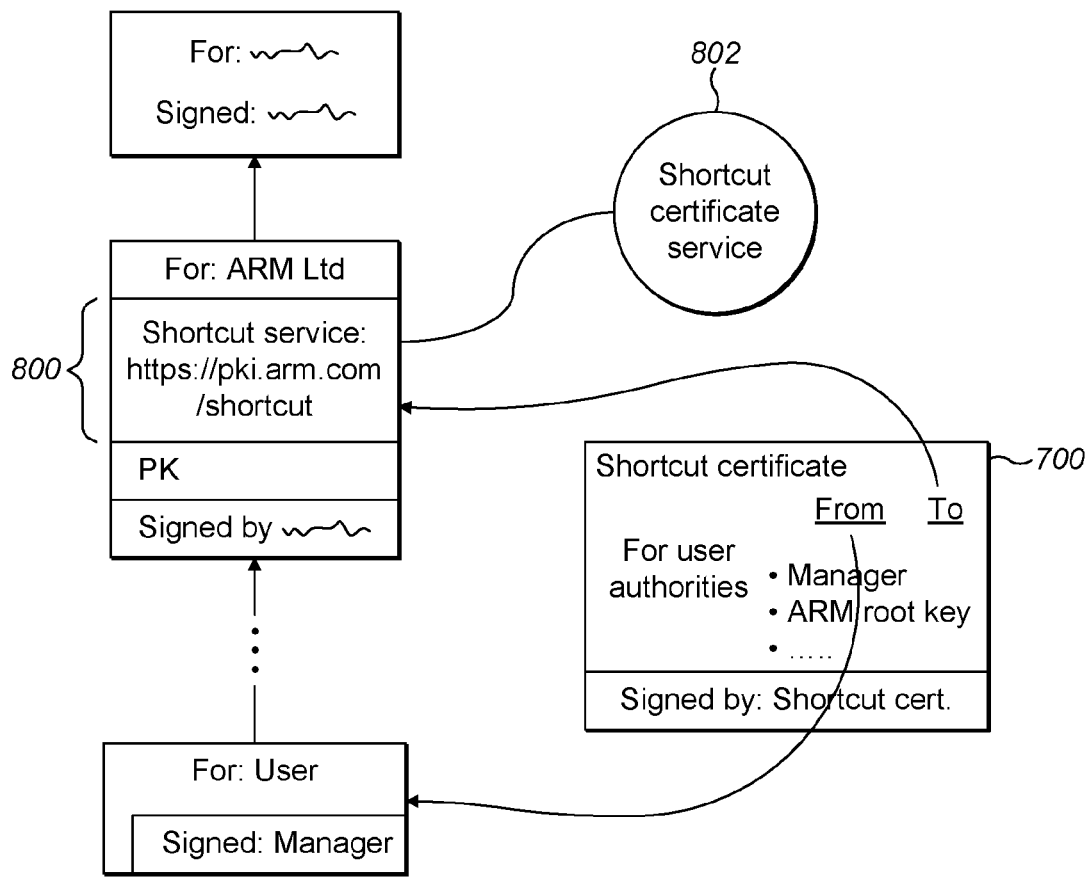
FIG. 8 illustrates schematically the creation of a shortcut certificate link to the shortcut certificate service provider.

The following passage of the description makes reference to FIGS. 6, 7 and 8. FIG. 7 illustrates schematically a shortcut certificate service provider as part of the network. In the present embodiment, the watch 600 is in close proximity to the door 602*a* and the watch transmits in step 608 its digital certificate 612 for authentication to the door 602*a*. It will be appreciated that since the watch 600 is approaching the entry door 602*a* for the first time then the entry door 602*a* must go through the validation process of validating the credentials to authenticate and trust the presented digital certificate 612 before allowing the user 604 to enter the building. Accordingly, the entry door 602*a* communicates in step 614 to a certificate store 616 to verify the hierarchical certificate chain of the digital certificate 612. The hierarchical certificate chain is followed 618, 620, and 622 until a trusted resource is reached in line with the security credentials of the building management provided to the entry door 602*a*. Upon reaching a trusted level of certification authority, say at step 620, a shortcut certificate 700 is created by the certificate store or the verification is communicated to a shortcut certificate service 702 for creation of the shortcut certificate 700. The shortcut certificate 700 may be communicated to nodes when the digital certificate of the issuing certification authority is authenticated. In embodiments, the nodes are other doors although in the general case the shortcut certificate 700 can be transmitted to a variety of devices on the network. Those devices that receive or trust the shortcut certificate 700 can be selected and classified by security application rules of the building management for example.

The shortcut certificate 700 comprises information 704 identifying the user of the certificate who has previously been authenticated through the hierarchy of digital certification authorities. The shortcut certificate 700 also identifies in a memory store the certification authorities 612, 618 and 620 that have been verified in the previous long certificate chain. The identity of the certification authorities that have been validated are contained in a local cache memory of the shortcut certificate 700 as a cryptographic hash of the particular certification authority. In this way, the shortcut certificate contains a unique fingerprint of each level in the chain of certification authorities. The shortcut certificate also is signed by the public key of the shortcut certificate service provider.

Other information may be contained in the shortcut certificate 700 such as information about the user, a timestamp, creation date, expiry date and validation time period. Indications of time are advantageous to be included in the shortcut certificate 700 because a further security measure is to make the maximum validity time of the shortcut certificate 700 to be the minimum validity time of any of the certificates in the chain. The maximum validity time can be the maximum allowed cache-lifetime of any certificates in the chain. The shortcut certificate 700 may comprise the creation date and each door 602*b-d* may have its own policy on how old a shortcut certificate 700 may become before it is refused and the verification chain is repeated. As such, the expiry date of the shortcut certificate 700 is less than the expiry date and cache time-out of any of the certificates in the chain of certification authorities. Moreover, an administrator may make a reasonable assumption of the time of any attack once a shortcut certificate is compromised and make some or all shortcut certificates 700 expire before that time.

Referring to step 712 at FIG. 6, the shortcut certificate 700 is communicated to the entry door 602*a* which in turn communicates the shortcut certificate to its class of doors 602*b-d*. Accordingly, any door 602*b-d* that trusts the shortcut certificate service 702 can treat a hierarchical certificate chain verification processes as interchangeable with the shortcut certificate 700. Such a level of trust may require an agent device to be configured to trust the shortcut certificate service. Agent device 606 is shown in FIG. 6 as a server room which is configured to require a higher level of permissions for a particular user to enter. Accordingly, access to the agent device 606 is denied because the permissions of the certificate of the user or not sufficient for entry to the server room.

Referring to FIG. 8, the creation of a shortcut certificate link 800 to the shortcut certificate service provider 802 is shown with the shortcut certificate service provider 802 being accessed as part of the hierarchical certificate chain verification process. As part of the present embodiment and as described in FIG. 6, the watch 600 is in close proximity to the door 602*a* and the watch transmits in step 608 its digital certificate 612 for authentication to the door 602*a*. It will be appreciated that since the watch 600 is approaching the entry door 602a for the first time then the entry door 602a must go through the validation process of validating the credentials to authenticate and trust the presented digital certificate 612 before allowing the user 604 to enter the building. Accordingly, the entry door 602a communicates in step 614 to a certificate store 616 to verify the hierarchical certificate chain of the digital certificate 612. When a trusted level of the hierarchical chain is reached, the job of the shortcut certificate 700 creation is delegated to a shortcut certificate service provider 802. The connection to the shortcut certificate service provider 802 can be made by a url embedded chain such as a hypertext transfer protocol secure (HTTPS) communications protocol.

Figure 9:
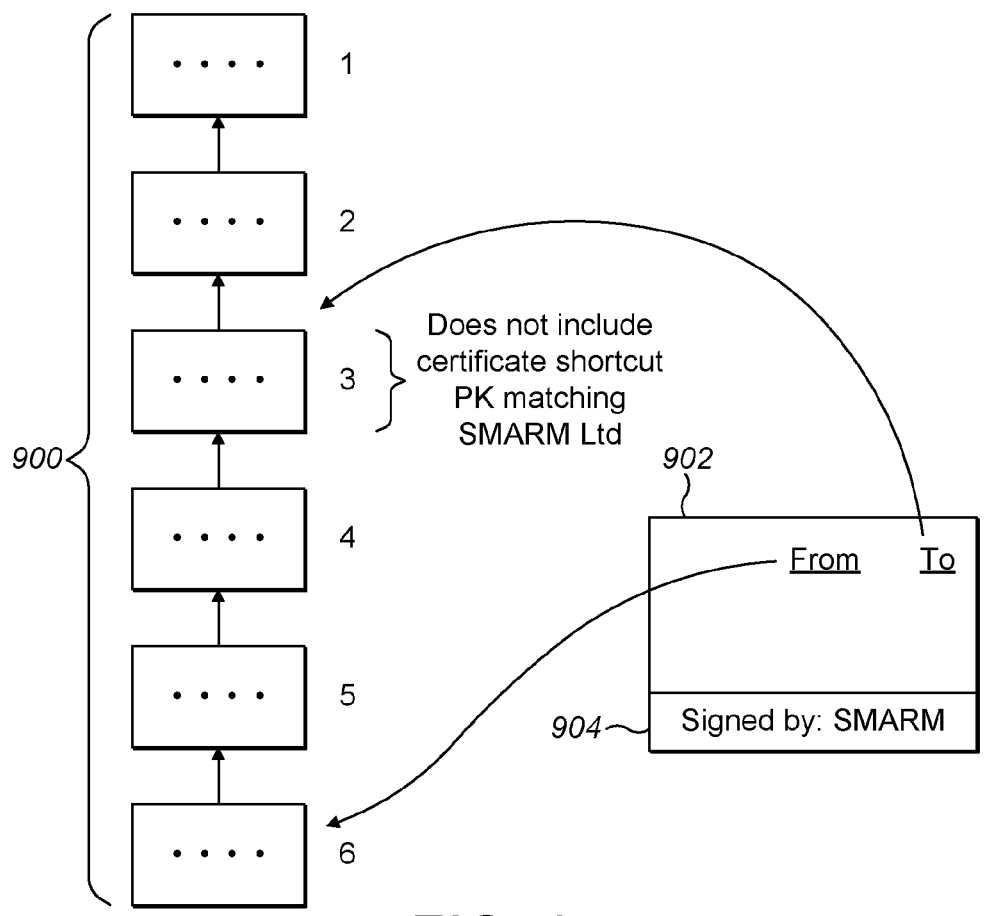
FIG. 9 illustrates schematically a rejection of authentication of a user certificate using a shortcut certificate.

Referring to FIG. 9, a rejection of authentication of a user certificate using a shortcut certificate is shown comprising a hierarchical certificate chain of the digital certificate verification process 900 and a shortcut certificate 902. The shortcut certificate 902 was created and signed by a certification authority of level 3. In the present embodiment the digital signature 904 of the certification authority 902 present on the shortcut certificate 902 does not match the private key of the certification authority 902 from where a level of trust was established in the hierarchical certificate chain of the digital certificate 902. Accordingly, the shortcut certificate 902 is rejected since no agent device has a reason to trust the shortcut certificate 902 as genuine. Instead an agent device can follow the "from" link identifying the trusted level of certification authority itself in order to verify the hierarchical certificate chain of the digital certificate 902 when the user presents their digital certificate to the agent device.

There may be other reasons for an agent device to reject a shortcut certificate even if the private key is matched. Such reasons may include performing random spot checks to detect a security breach or a bug in the shortcut service; giving higher security conditions for more sensitive access points such a server room or personnel records room; or there may be an external reason for distrust such as unfamiliar authorities in the chain of certification authorities or a recent break-in the building. Additionally, a shortcut certificate may comprise different permissions for different classes of agent device alone or in combination. For example, a shortcut certificate may be trusted by doors but not by light switches or a combination of both depending upon how the building management configures the building security credentials.

Whilst the above examples have illustrated embodiments with respect to a hierarchical certificate chain of the digital certificate, it may not be necessary in every embodiment to carry out an authentication check along a chain or to generate a shortcut certificate comprising the identity of the certification authorities that have been validated in a local cache memory of the shortcut certificate as a cryptographic hash of the particular certification authority. For example, the user digital certificate may be issued by a trusted certification authority in the first place. Also, the shortcut certificate may be in the form of a shared secret which in some embodiments may occur if the shortcut certificate service creates a shortcut certificate which may be signed using a shared secret. Signing the certificate with a shared secret has the benefit of being computationally easier to verify. The shared secret could be a password or randomly assigned number of bytes. It may be more preferable to create the shared key at the start of the communication session between the devices using a key-agreement protocol rather than having a pre-shared key.

Figure 10:
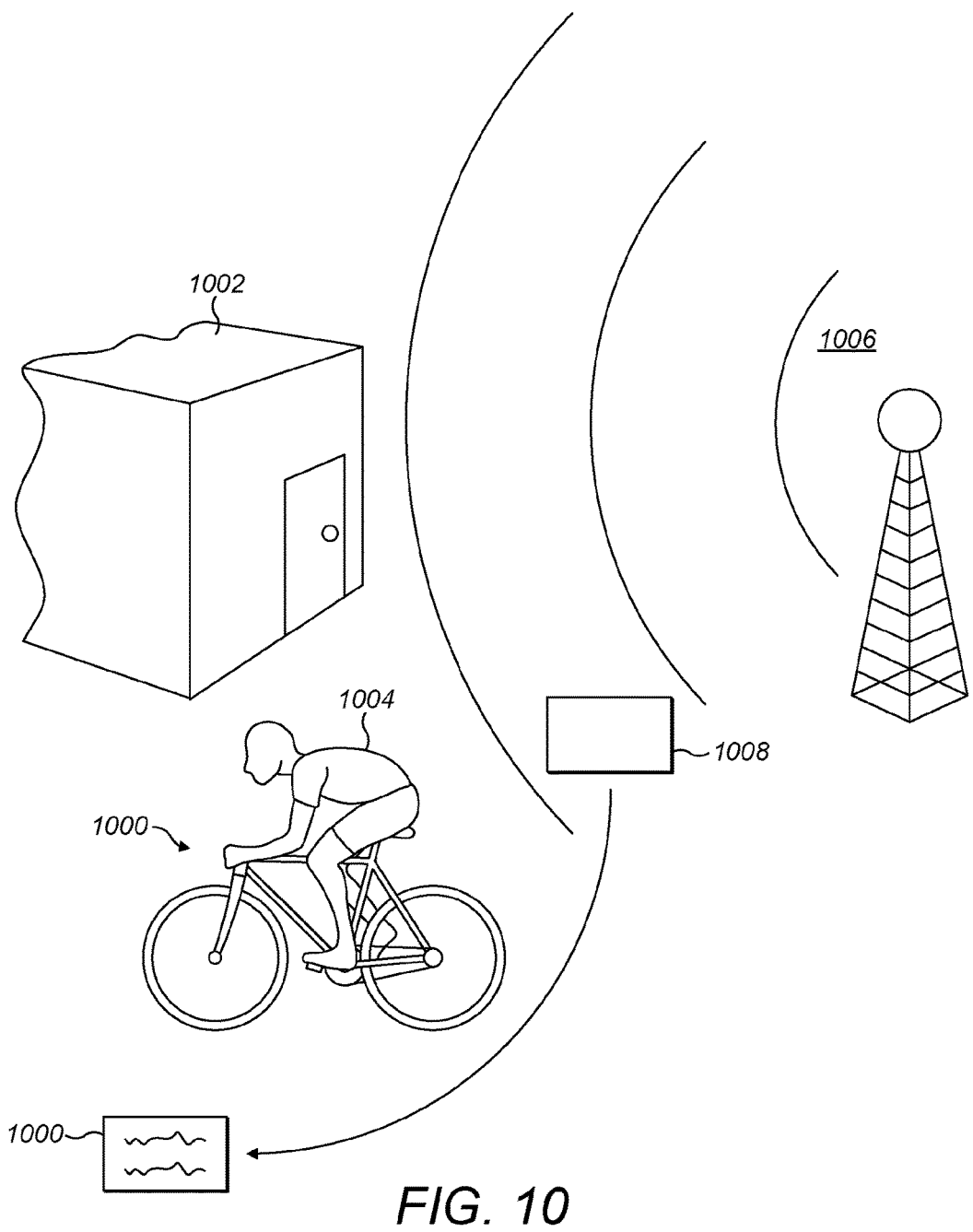
FIG. 10 illustrates schematically an example of remote fetching of a shortcut certificate.

FIG. 10 illustrates an example of remote fetching of a shortcut certificate. As best seen in FIG. 10, a user 1000 is in process of commuting to a workplace 1002. An envoy device 1004 is carried by the user 1002 and establishes that the user is passing a certain geolocation by using positioning on a cellular network 1006 such as a 3G or 4G. Other communications include wifi, Bluetooth and Bluetooth Low Energy. Since the behaviour of the user on that route for that time of day is typical, the envoy device 1004 pre-fetches 1008 a shortcut certificate 1010 for an entry door which is commonly accessed by the user in that environment. Such a shortcut certificate 1010 may be created using any of the processes described above. When the user 1004 arrives at the entry door the access may be facilitated without repeating verification of the hierarchical certificate chain of the digital certificate.

Viewed from one aspect, the technique provides a method of generating a shortcut certificate for authenticating a user digital certificate generated by an issuing certification authority; the method comprising: authenticating the digital certificate of the issuing certification authority; creating the shortcut certificate for the digital certificate of the issuing certification authority when the digital certificate of the issuing certification authority is authenticated; wherein the shortcut certificate comprises a signed entry of an authentication of the issuing certification authority.

The issuing certification authority may belong to a hierarchy of certification authorities and the method may therefore include authenticating the digital certificate of the issuing certification authority by validating each certification authority in a chain of parent certification authorities.

Other embodiments alone or in combination may include that the shortcut certificate comprises a cached entry of an identifier of each certification authority in the chain; that the identifier comprises a hash of the digital certificate of each certification authority in the chain; that the shortcut certificate comprises a timestamp of the shortcut digital certificate; that an expiry date of the shortcut certificate is no greater than the expiry date of any digital certificate of each certification authority in the chain; that an expiry date of the shortcut certificate is no greater than the cache timeout of any digital certificate of each certificate authority in the chain; that the authenticating step includes checking a certificate revocation list of each respective certificate authority in the chain; that the authenticating step includes the step of verifying the digital signature of the user digital certificate using a corresponding public key; that the authenticating step includes the step of verifying the digital signature of each certification authority in the chain using a corresponding public key; that the method includes communicating the user digital certificate from the memory of a client device.

Other embodiments alone or in combination include that the client device is an envoy device and that the envoy device is one of a smartphone, watch or embedded device. Other embodiments alone or in combination include accessing a resource of an agent device through authentication of the user digital certificate, optionally wherein the agent device has an agent device digital certificate generated by an issuing certification authority; the agent device digital certificate may comprise a permission level governing which resource of the agent device can be accessed by the client device and authenticating may include validating each certification authority in the chain of parent certification authorities until a trusted authority known to the entry agent device is reached or validating from the issuing certification authority to a root certification authority.

The trusted authority may be trusted to the permission level governing which resource of the agent device can be accessed by the client device and the method of authenticating may be processed in the memory local to the agent device. Further, the method of authenticating is delegated to a local server in communication to a network and the agent device may be a point of access and the resource is being permitted to open the point of access.

In other embodiments alone or in combination, the agent device is one of a class of other agent devices; is doors in a building environment and the shortcut certificate may be transmitted to other agent devices within the class of other agent devices. The other agent devices may be within a peer-to-peer network being connected in a wired network, a wireless network or a combination of both. Each other agent device member of the class may comprise credentials that are used to prove class membership when receiving the shortcut certificate and such credentials may be X.509 certificates known as group membership certificates.

The method may include embodiments alone or in combination including presenting the envoy device to another agent device within the class and authenticating the digital certificate of the issuing certification authority by validating the shortcut certificate for the digital certificate of the issuing certification authority. The step of authenticating and creating may be initiated when the envoy device is in proximity to the agent device. The step of authenticating and creating may be initiated when the envoy device is remote from the agent device and the envoy device may be detected by a first network at a first geolocation and in response to the detection the step of authentication and creating may be initiated. Such detection may use wifi, Bluetooth, Bluetooth Low Energy or cellular networks and identification of the envoy device can use a MAC address. Geolocation of the envoy device can be determined by cellular tower identification with signal strength or GPS and the shortcut certificate may be pushed to the agent device in advance of the envoy device being in proximity to the agent device.

In embodiments alone or in combination, the local server in network communication with a shortcut certificate server is adapted so that the provisioning of the shortcut certificate is separate to the agent device. The shortcut certificate server may form part of the chain of parent certification authorities and may be connected to the chain by a link within a digital certificate of a parent certification authority. The shortcut certificate server may be connected when a trusted parent certification authority is reached in the chain.

Viewed from another aspect, a method of provisioning access of a client device to a resource of a plurality of agent devices, comprises: presenting the client device to an agent device, the client device bearing a digital certificate of an issuing certification authority; at the agent device receiving authentication of the digital certificate from a validation of the issuing certification authority and allowing the client device access to the resource of the agent device; receiving at other agent devices a shortcut certificate for the digital certificate of the issuing certification authority, wherein the shortcut certificate comprises a signed entry of an authentication of the issuing certification authority; and presenting the client device to one of the other agent devices and receiving authentication of the shortcut certificate and allowing the client device access to the resource of one of the other agent devices.

In embodiments alone or in combination the issuing certification authority belongs to a hierarchy of certification authorities and the method includes: authenticating the digital certificate of the issuing certification authority by validating each certification authority in a chain of parent certification authorities. The shortcut certificate may comprise a cached entry of an identifier of each certification authority in the chain. The identifier may comprise a hash of the digital certificate of each certification authority in the chain.

Viewed from another aspect, the present technique provides a hardware apparatus for generating a shortcut certificate for authenticating a user digital certificate generated by an issuing certification authority the hardware apparatus comprising a module with: an input for receiving an authentication request for the digital certificate of the issuing certification authority and a processor block having logic gates for validating each certification authority and for creating the shortcut certificate for the digital certificate of the issuing certification authority when the digital certificate of the issuing certification authority is authenticated; a memory store for storing the shortcut certificate, wherein the shortcut certificate comprises a signed entry of an authentication of the issuing certification authority; and an output capable of transmitting the shortcut certificate to one or more nodes on a network.

In embodiments alone or in combination, the module is local to an agent device and the transmitting of the shortcut certificate may be an out of band transmission; the module may be located on a networked device management server. Further, the transmitting of the shortcut certificate may be done via an intermediary node.

Viewed from another aspect, a digital shortcut certificate may be stored on a computer media for authenticating a user digital certificate generated by an issuing certification authority and belonging to a hierarchy of certification authorities; the shortcut certificate comprising a cached entry of an identifier of each certification authority in a chain of parent certification authorities.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

Those skilled in the art will appreciate that while the foregoing has described what is considered to be the best mode and where appropriate other modes of performing the technique, the technique should not be limited to the specific configurations and methods disclosed in this description of the preferred embodiment. Those skilled in the art will recognise that the technique has a broad range of applications, and that the embodiments may take a wide range of modifications without departing from the inventive concept as defined in the appended claims.

We claim:

1. A method of generating a shortcut certificate for authenticating a digital certificate generated by an issuing certification authority belonging to a hierarchy of certification authorities; the method comprising:
    authenticating, at a certificate store, the digital certificate of the issuing certification authority by validating each certification authority in a chain of parent certification authorities, each of the certification authorities having a corresponding validity time period;
    creating, at a shortcut certificate service provider node, the shortcut certificate for the digital certificate of the issuing certification authority when the digital certificate of the issuing certification authority is authenticated,
    wherein the shortcut certificate comprises a signed entry of an authentication of the issuing certification authority and a validation time period based on a minimum one of the corresponding validity time periods of the certification authorities in the chain of parent certification authorities; and
    transmitting, by the shortcut certificate service provider node, the user digital certificate to a client device.

2. The method of claim 1, wherein the shortcut certificate comprises a cached entry of an identifier of each certification authority in the chain.

3. The method of claim 1, wherein the authenticating step includes checking a certificate revocation list of each respective certificate authority in the chain.

4. The method of claim 1, including accessing a resource of an agent device through authentication of the user digital certificate.

5. The method of claim 4, wherein the agent device has an agent device digital certificate generated by an issuing certification authority.

6. The method of claim 5, wherein the agent device digital certificate comprises a permission level governing which resource of the agent device can be accessed by the client device.

7. The method of claim 6, wherein authenticating includes validating each certification authority in the chain of parent certification authorities until a trusted authority known to the entry agent device is reached or validating from the issuing certification authority to a root certification authority.

8. The method of claim 7, wherein the trusted authority is trusted to the permission level governing which resource of the agent device can be accessed by the client device.

9. The method of claim 4, wherein the agent device is one of a class of other agent devices.

10. The method of claim 9, wherein the shortcut certificate is transmitted to other agent devices within the class of other agent devices.

11. The method of claim 10, wherein the client device is an envoy device and including presenting the envoy device to another agent device within the class and authenticating the digital certificate of the issuing certification authority by validating the shortcut certificate for the digital certificate of the issuing certification authority.

12. The method of claim 9, wherein each other agent device member of the class comprises credentials that are used to prove class membership when receiving the shortcut certificate.

13. The method of claim 12, wherein the credentials are X.509 certificates known as group membership certificates.

14. The method of claim 4, wherein the client device is an envoy device, and wherein the step of authenticating and creating is initiated when the envoy device is in proximity to the agent device.

15. The method of claim 4, wherein the client device is an envoy device, and wherein the step of authenticating and creating is initiated when the envoy device is remote from the agent device.

16. The method of claim 15, wherein the envoy device is detected by a first network at a first geolocation and in response to the detection the step of authentication and creating is initiated.

17. The method of claim 16, wherein identification of the envoy device can use a MAC address.

18. The method of claim 16, wherein the geolocation of the envoy device can be determined by cellular tower identification with signal strength or GPS.

19. The method of claim 16, wherein the shortcut certificate is pushed to the agent device in advance of the envoy device being in proximity to the agent device.

20. A method of provisioning access of a client device to a resource of a plurality of agent devices, the method comprising:
- presenting the client device to an agent device, the client device bearing a digital certificate of an issuing certification authority belonging to a hierarchy of certification authorities;
- at the agent device, receiving authentication of the digital certificate from a validation of the issuing certification authority by validating each certification authority in a chain of parent certification authorities, each of the certification authorities having a corresponding validity time period, and allowing the client device access to the resource of the agent device;
- receiving at other agent devices a shortcut certificate for the digital certificate of the issuing certification authority, wherein the shortcut certificate comprises a signed entry of an authentication of the issuing certification authority and a validation time period based on a minimum one of the corresponding validity time periods of the certification authorities in the chain of parent certification authorities; and
- presenting the client device to one of the other agent devices and receiving authentication of the shortcut certificate and allowing the client device access to the resource of one of the other agent devices.

21. Hardware apparatus for generating a shortcut certificate for authenticating a digital certificate generated by an issuing certification authority belonging to a hierarchy of certification authorities, the hardware apparatus comprising a module with:
- an input for receiving an authentication request for the digital certificate of the issuing certification authority and a processor block having logic gates for validating each certification authority in a chain of parent certification authorities, each of the certification authorities having a corresponding validity time period, and for creating the shortcut certificate for the digital certificate of the issuing certification authority when the digital certificate of the issuing certification authority is authenticated;
- a memory store for storing the shortcut certificate, wherein the shortcut certificate comprises a signed entry of an authentication of the issuing certification authority and a validation time period based on a minimum one of the corresponding validity time periods of the certification authorities in the chain of parent certification authorities; and
- an output capable of transmitting the shortcut certificate to one or more nodes on a network.

* * * * *